(12) United States Patent
Smith

(10) Patent No.: US 11,242,849 B1
(45) Date of Patent: Feb. 8, 2022

(54) DUAL USE VALVE MEMBER FOR A VALVE ASSEMBLY

(71) Applicant: Vulcan Industrial Holdings, LLC, Houston, TX (US)

(72) Inventor: Jason David Smith, Porter, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 16/929,241

(22) Filed: Jul. 15, 2020

(51) Int. Cl.
| F16K 15/06 | (2006.01) |
| F16K 15/02 | (2006.01) |
| F04B 53/10 | (2006.01) |
| E21B 43/26 | (2006.01) |

(52) U.S. Cl.
CPC ...... *F04B 53/1087* (2013.01); *F04B 53/1022* (2013.01); *F16K 15/028* (2013.01); *F16K 15/063* (2013.01); *E21B 43/2607* (2020.05)

(58) Field of Classification Search
CPC .......................... F04B 53/129; F04B 53/1087; F04B 53/1022; Y10T 137/7915; Y10T 137/7917; F16K 15/028; F16K 15/063
See application file for complete search history.

(56) References Cited

U.S. PATENT DOCUMENTS

| 1,576,269 | A | * | 3/1926 | Durant | F16K 15/063 |
| | | | | | 137/329.02 |
| 1,595,459 | A | * | 8/1926 | Durant | F16K 15/063 |
| | | | | | 137/329.04 |
| 1,671,139 | A | | 5/1928 | Wilson | |
| 1,963,684 | A | * | 6/1934 | Shimer | F16K 15/063 |
| | | | | | 137/329.04 |
| 1,963,685 | A | * | 6/1934 | Shimer | F16K 15/063 |
| | | | | | 137/329.04 |
| 2,506,128 | A | | 5/1950 | Ashton | |
| 2,547,831 | A | | 4/1951 | Mueller | |
| 3,224,817 | A | | 12/1965 | Miller | |
| 3,276,390 | A | | 10/1966 | Bloudoff | |
| 3,483,885 | A | * | 12/1969 | Leathers | F16K 15/02 |
| | | | | | 137/329.02 |

(Continued)

FOREIGN PATENT DOCUMENTS

| CN | 201149099 | 11/2008 |
| CN | 102410194 | 4/2012 |

(Continued)

OTHER PUBLICATIONS

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.

(Continued)

*Primary Examiner* — Umashankar Venkatesan
(74) *Attorney, Agent, or Firm* — Hogan Lovells US LLP

(57) ABSTRACT

A valve member for a valve assembly includes a body. The valve member also includes a first sealing assembly, coupled to the body at a first end, the first sealing assembly forming at least a portion of a first end strike face. The valve member further includes a second sealing assembly, coupled to the body at a second end opposite the first end, the second sealing assembly forming at least a portion of a second end strike face. The valve member also includes a guide leg assembly coupled to the body at the first end.

20 Claims, 15 Drawing Sheets

(56) References Cited

U.S. PATENT DOCUMENTS

| | | | |
|---|---|---|---|
| 3,809,508 | A | 5/1974 | Uchiyama |
| 4,662,392 | A | 5/1987 | Vadasz |
| 4,763,876 | A | 8/1988 | Oda |
| 5,061,159 | A | 10/1991 | Pryor |
| 5,209,495 | A | 5/1993 | Palmour |
| 5,540,570 | A | 7/1996 | Schuller |
| 6,382,940 | B1 | 5/2002 | Blume |
| 7,186,097 | B1 | 3/2007 | Blume |
| 7,341,435 | B2 | 3/2008 | Vicars |
| 7,506,574 | B2 | 3/2009 | Jensen |
| 7,726,026 | B1 | 6/2010 | Blume |
| 7,866,346 | B1 | 1/2011 | Walters |
| 8,069,923 | B2 | 12/2011 | Blanco |
| 8,083,506 | B2 | 12/2011 | Maki |
| 8,402,880 | B2 | 3/2013 | Patel |
| 9,285,040 | B2 | 3/2016 | Forrest |
| 9,377,019 | B1 | 6/2016 | Blume |
| 9,435,454 | B2 | 9/2016 | Blume |
| 9,528,508 | B2 | 12/2016 | Thomeer |
| 9,822,894 | B2 | 11/2017 | Bayyouk |
| 2003/0205864 | A1 | 11/2003 | Dietle |
| 2005/0200081 | A1 | 9/2005 | Stanton |
| 2006/0045782 | A1 | 3/2006 | Kretzinger |
| 2008/0279706 | A1 | 11/2008 | Gambier |
| 2009/0261575 | A1 | 10/2009 | Bull |
| 2011/0255993 | A1 | 10/2011 | Ochoa |
| 2014/0286805 | A1 | 9/2014 | Dyer |
| 2015/0219096 | A1 | 8/2015 | Jain |
| 2015/0300332 | A1 | 10/2015 | Cobb |
| 2016/0238156 | A1* | 8/2016 | Hubenschmidt .... F16K 37/0008 |
| 2017/0089473 | A1 | 3/2017 | Nowell |
| 2017/0097107 | A1 | 4/2017 | Hotz |
| 2017/0342976 | A1* | 11/2017 | Nagaraja Reddy ..... F04B 15/02 |
| 2019/0017503 | A1 | 1/2019 | Foster |

FOREIGN PATENT DOCUMENTS

| | | |
|---|---|---|
| CN | 102748483 | 10/2012 |
| EP | 0414955 | 3/1991 |

OTHER PUBLICATIONS

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.

White Star Pump Co., "Maintenance Manual: Triplex Pump WS-1300/1600," 2005, http://www.whitestarpump.com/ES/docs/user_t.pdf, 45 pages.

* cited by examiner

DUAL USE VALVE MEMBER FOR A VALVE ASSEMBLY

TECHNICAL FIELD

Embodiments of the subject matter disclosed herein generally relate to pump systems, and in particular to valves in pump systems.

BACKGROUND

Pumping systems may be used in a variety of applications, especially industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A valve assembly includes valve members that reciprocate and contact valve seats at the inlet and outlet passages. Due to the particulates and corrosive nature of the working fluid, the valve seats and/or portions of the valve member may become eroded or otherwise damaged, which my prevent sealing of the inlet and outlet passages.

SUMMARY

Applicants recognized the problems noted above herein and conceived and developed embodiments of systems and methods, according to the present disclosure, for valve assemblies in pump systems.

In accordance with one or more embodiments, a valve assembly for a fracturing pump includes a valve seat having a bore, the valve seat having a strike face. The valve assembly also includes a valve member positioned to reciprocate within the bore, the valve member moving between open and closed positions. The valve member includes a body, a first sealing assembly positioned proximate a first body strike face at a first end of the body, and a second sealing assembly positioned proximate a second body strike face at a second end of the body, the second end being opposite the first end. The valve member also includes legs removably coupled to the body.

In accordance with another embodiment, a valve member for a valve assembly includes a body. The valve member also includes a first sealing assembly, coupled to the body at a first end, the first sealing assembly forming at least a portion of a first end strike face. The valve member further includes a second sealing assembly, coupled to the body at a second end opposite the first end, the second sealing assembly forming at least a portion of a second end strike face. The valve member also includes a guide leg assembly coupled to the body at the first end.

In accordance with another embodiment, a method for adjusting a valve member includes removing a valve member from a pumping assembly, the valve member being in a first orientation. The method also includes detaching legs from a first side of the valve member body. The method further includes changing an orientation of the valve member body to a second orientation, different from the first orientation. The method includes attaching legs to a second side of the valve member body. The method also includes installing the valve member into the pumping assembly in the second orientation.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
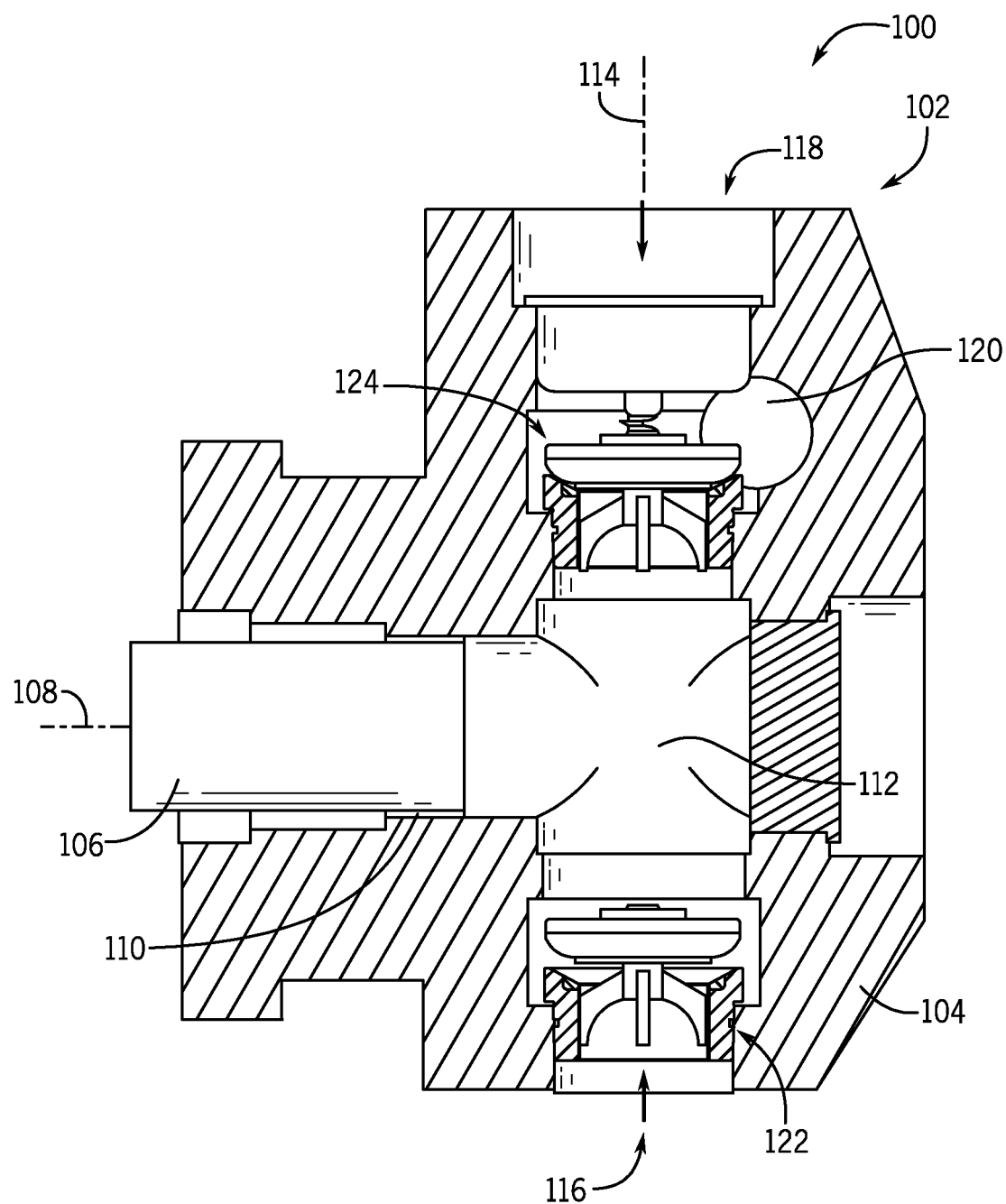
FIG. 1 is a schematic cross-sectional view of an embodiment of a pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward a valve assembly for use in positive displacement reciprocating pumps. The disclosed valve assembly includes a valve member having a metal body geometry (which may be symmetrical in certain embodiments) and polymer sealing element geometry on a top side and a bottom side of the valve body. Each side of the valve member is designed to engage with industry standard valve seat geometry. The valve member also includes a modular guidance system in the form of four pronged metal guide legs, which attach to the valve on either the top side of the valve member or the bottom side of the valve member. The guide legs are designed to engage with the throat diameter of industry standard valve seats. The guide legs could be constructed from metal, plastics, or some other type of high strength composite material. Furthermore, while embodiments may describe guide legs that include 4 prongs, other embodiments may include 3 prongs, 5 prongs, or any reasonable number of prongs.

In embodiments, the valve body element attaches to the guide leg element via the use of a spring loaded locking ball pin. However, other coupling assemblies may be used in various embodiments, or within the same valve body. For example, the valve body may be coupled to the guide legs via a magnetic attachment, a bolt through connection, or integral threaded sections (on either the valve body or the guide legs).

In embodiments, the sealing elements on the valve body are constructed from rubber, polyurethane, or some other plastic or rubber compound. The sealing elements may be secured onto the valve body element by snapping them onto the valve body or via over-molding the polyurethane via injection molding. The valve body element is typically constructed from alloy steel and typically gas carburized case hardened, but could be made from any metal or include various coatings and the like. Embodiments of the disclosure include a valve body particularly selected to have a top side geometry and bottom side geometry that is symmetrical across a midsection of the valve. However, it should be appreciated that various grooves or differences may be present, for example within the body or differently shaped sealing elements. Each side of the valve is designed to engage with industry standard valve seats utilizing a 30-degree contact strike face and sealing surface. Although in other design embodiments, the valve could be designed with a strike face and sealing geometry with an angle of 0 to 89 degrees.

The valve member of present embodiments is designed with a modular valve guidance leg system that allows for the valve guide legs to be quickly removed from the valve body element and reattached to the other side of the valve body element. There are various ways that the valve guidance legs could attach to the valve body element, as discussed above.

Large pumps are commonly used for mining and oilfield applications, such as, for example, hydraulic fracturing. During hydraulic fracturing, fracturing fluid (i.e., cement, mud, frac sand, and other material) is pumped at high pressures into a wellbore to cause the producing formation to fracture. Hydraulic fracturing pumps of 2,250-5,000 horsepower may utilize embodiments of the present disclosure. However, it should be appreciated that the hydraulic fracturing pumps are illustrative and embodiments of the present disclosure may be used in a variety of different applications, such as positive displacement reciprocating pumps, including lower horsepower pumps. The fracturing fluid is caused to flow into and out of a pump fluid chamber as a consequence of the reciprocation of a piston-like plunger respectively moving away from and toward the fluid chamber. As the plunger moves away from the fluid chamber, the pressure inside the chamber decreases, creating a differential pressure across an inlet valve, drawing the fracturing fluid through the inlet valve into the chamber. When the plunger changes direction and begins to move towards the fluid chamber, the pressure inside the chamber substantially increases until the differential pressure across an outlet valve causes the outlet valve to open, enabling the highly pressurized fracturing fluid to discharge through the outlet valve into the wellbore.

Because of the high operating pressures (oftentimes up to 20,000 psi) and the abrasive solid particles associated with the fracturing fluid, the mating surfaces on valve members and valve seats tend to wear at a rapid rate, and thus, the valve members and valve seats are replaced frequently. This is principally due to the high fluid pressures creating axial loads on the mating surfaces, which become worn and pitted due to particulates from the fracturing fluid being trapped therebetween. In addition, a significant amount of damage occurs to the valve assembly as a result of high impact force contact between the valve body with the valve seat as a consequence of the valve body rapidly approaching the valve seat. Thus, there is a need for a valve assembly that can be used for a longer period of time before ultimately having to be replaced with new components.

Embodiments of the present disclosure may extend the useful life of the valve assembly by allowing the valve member to be effectively used twice before being discarded and replaced with new components. Prior art valves can only be used once for a period of time typically 50-120 pumping hours before the valve element strike face and urethane sealing element have sustained heavy damage and the valve is discarded and replaced. This replacement of worn out valves is a significant expense for pump operators. Embodiments of the present disclosure overcome this problem by presenting a valve member that is used for a first time and after some period of time (e.g., 50-120 pumping hours). Over this first time, damage is sustained to the strike face and sealing element due to the nature of the pumping operation. The valve member is then removed from the pump and the pump operator detaches the modular guide legs for the valve member. The valve body is then flipped over and the guidance legs attached to the opposite side of the valve body. By doing this the worn out side of the valve is now facing up and no longer in use and a new unused strike face surface and urethane sealing element is now facing downwards and will be engaging with the valve seat, effectively a brand new valve that can be reassembled into the pump fluid end and used for another 50-120 hours before accumulating sufficient damage to be discarded. This design may double an effective useful life of the valve member and decrease pump operator costs for replacement valves by approximately 50% or more.

Prior art valves are one time use, only one side of the valve that is designed to engage with the valve seat, it is used once and when it wears out the entire valve is discarded and replaced with a new one. Prior art valves also have non-detachable valve leg guidance system. Embodiments of the present disclosure overcome this problem and provide an improved valve member that includes a pair of strike faces along with detachable, module guide legs, among other features.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet chamber 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger 106, and is driven out of the pressure chamber 112 into the outlet chamber 118 and out an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed positon, while the spring force of the valve assembly 124 is overcome, thereby enabling the fluid to exit via the outlet passage 120.

As will be described in detail below, the valve assemblies 122, 124 may include a valve seat face, which may include a strike face. The strike face may contact a sealing face of a valve member as the valve member transitions between an open position and a closed position. Due to the nature of the working fluid (e.g., corrosive and filled with particulates), wear may develop along the strike face, thereby reducing its sealing effectiveness. Moreover, in various embodiments, feature may be incorporated into a liner to facilitate pump operation. In certain embodiments, the features may correspond to guides formed within a liner and/or a portion of an insert to receive a portion of the valve member. The guides may prevent misalignment and/or rotation of the valve member during operation. Furthermore, in embodiments, the features may correspond to flow channels formed in the liner and/or at least a portion of the insert. The flow channels may also be integrated into embodiments that include the guides.

Figure 2:
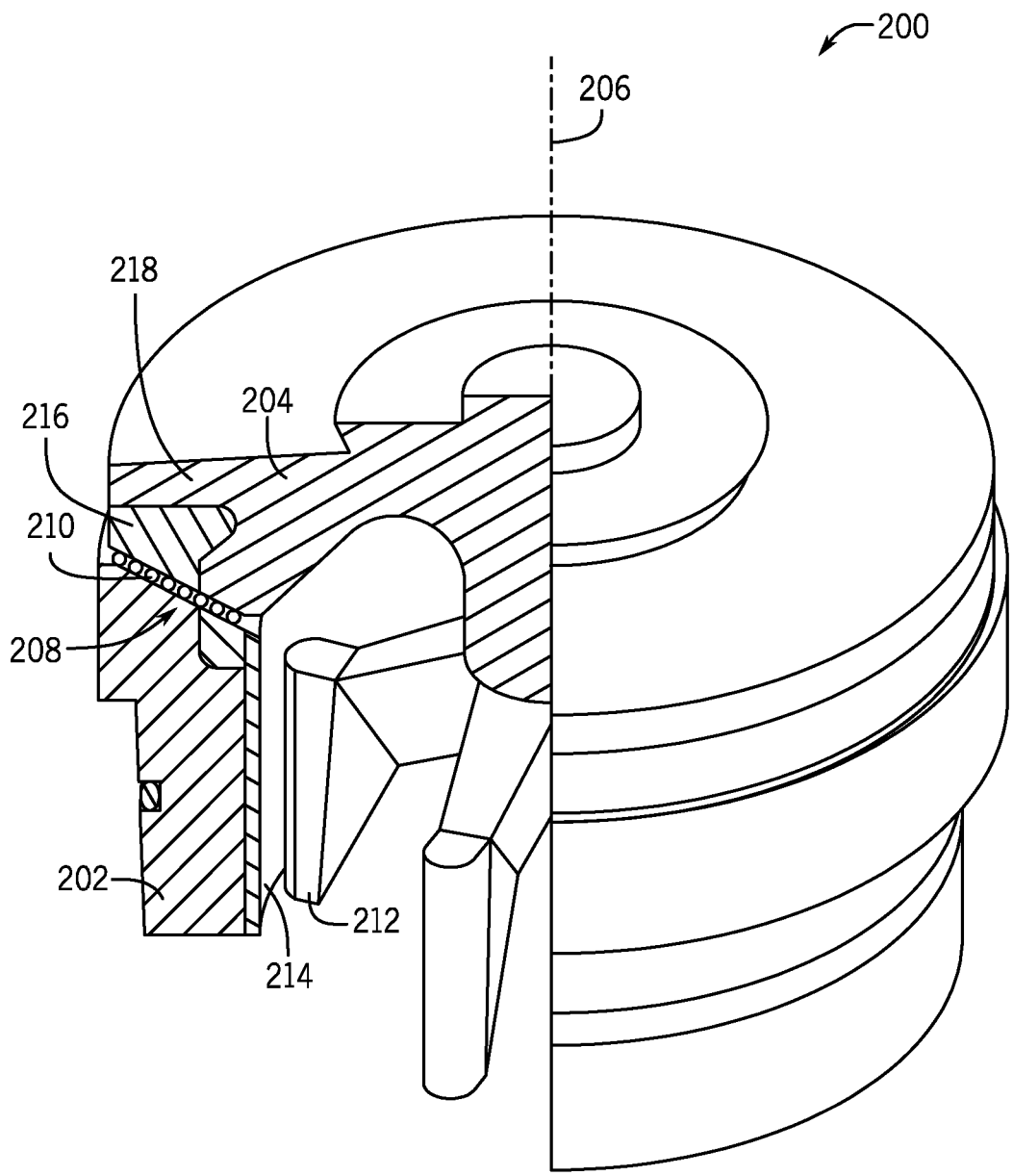
FIG. 2 is a schematic sectional view of an embodiment of a valve assembly, in accordance with embodiments of the present disclosure.

FIG. 2 is a schematic cut away view of an embodiment of a valve assembly 200, such as the valve assemblies 122, 124, which may be utilized with a pump assembly. The illustrated valve assembly 200 includes a valve seat 202 and a valve member 204. In operation, the valve member 204 reciprocates along a valve axis 206, which may correspond to the pressure chamber axis 114, such that the valve member 204 moves into and out of contact with the valve seat 202. In the illustrated embodiment, particulates 208 have accumulated along the valve seat 202, for example at a strike face 210 (e.g., contact face). Repeated contact from the valve member 204 may drive the particulates 208 into the strike face 210, causing scarring or other damage to one or both of the valve seal 216 and/or valve member 204. Additionally, corrosive fluids may contact other portions of the valve seat 202 and/or valve member 204, in addition to the strike face 210. Damage to the valve seat 202 and/or valve member 204 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend along a bore 214 of the valve member 204. Due to the presence of the corrosive fluid and/or the particulates, damage may occur along the bore 214, such as scarring. Additionally, damage may also accumulate on the guide legs 212. As a result, the pump assembly may be taken out of service for repairs, which may be expensive and also contribute to non-productive time at the well site. Furthermore, various components of the valve assembly 200 are often replaced rather than repaired, thereby increasing costs for operators.

While various components of the valve seat 202 may be exposed to damage, similar damage may also occur to the valve member 204. For example, the valve member 204 may include a sealing element 216 (e.g., sealing assembly, seal assembly) arranged circumferentially about a body 218 (e.g., valve body). In various embodiments, the sealing element 216 is an elastomer, which may be susceptible to damage due to repeated contact with the particulates 208 and/or due to the force of striking the strike face 210. Damage to the valve member 204 may also reduce the sealing effectiveness of the valve assembly 200, thereby leading to replacement or repairs. During a typical fracturing operation, hundreds of valve members 204 may be replaced, which can lead to high costs for operators. Embodiments of the present disclosure may include improved valve members with an increased working life, which may reduce costs associated with hydraulic fracturing operations.

Figure 3:
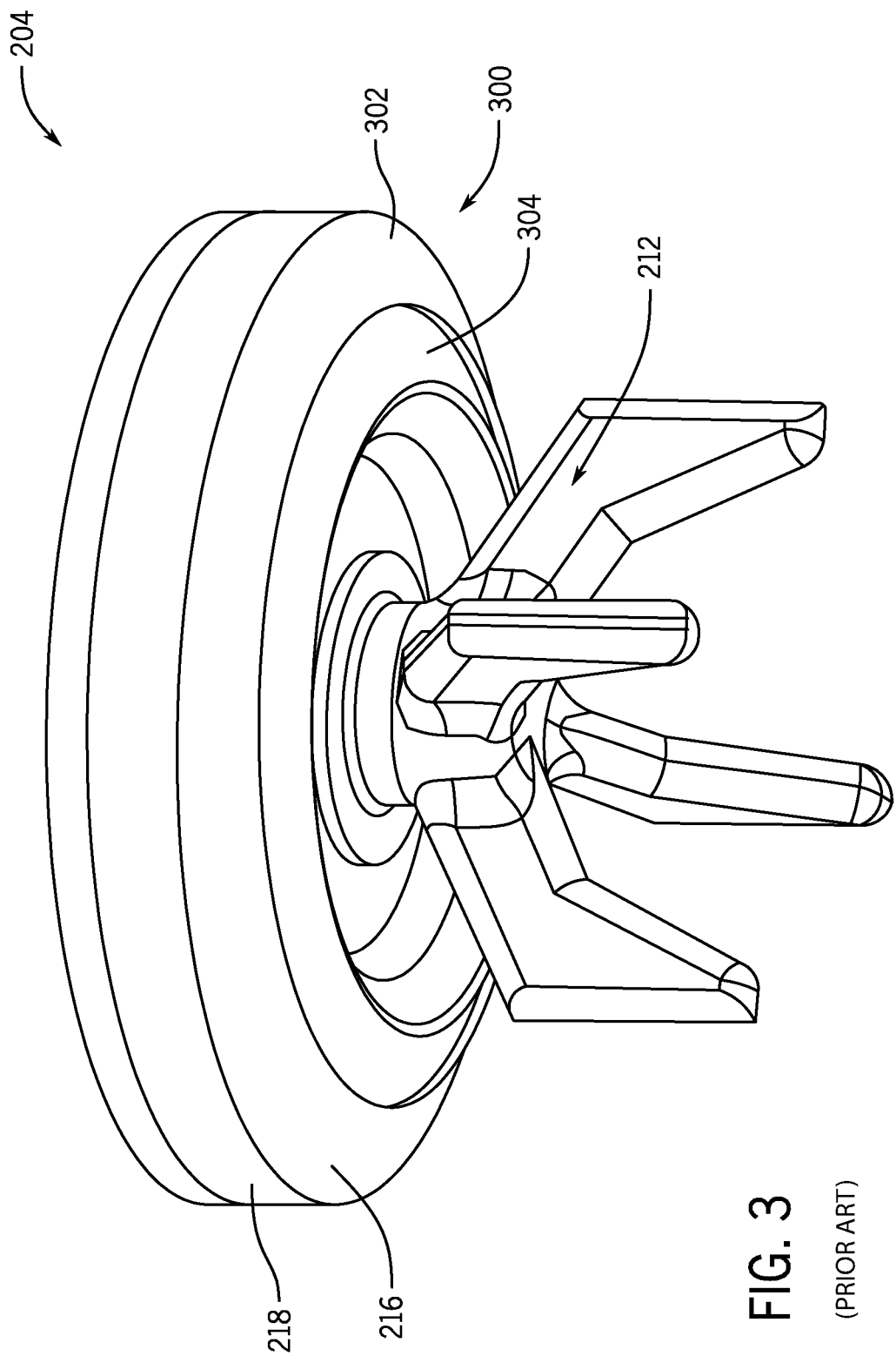
FIG. 3 is a perspective view of an embodiment of a valve member, in accordance with embodiments of the present disclosure.

FIG. 3 is a perspective view of an embodiment of a valve member 204 that illustrates the sealing element 216 positioned circumferentially about the valve body 218. In various embodiments, the sealing element 216 is integrally formed and/or secured to the valve body 218. As a result, the sealing element 216 may not be removable when damaged. For example, a valve member strike face 300 may include a sealing element strike face 302 and a body strike face 304. During operation, any portion of the valve member strike face 300 may be damaged due to contact with the strike face 210 and/or the particulates 208, as well as potentially corrosive fluids. However, as noted above, the sealing element 216 may be integrally formed to the body 218. Furthermore, the guide legs 212, which are also susceptible to damage, may also be integral components that cannot be removed or reused. As a result, damage to the valve member 204 often leads to replacement or costly repairs. Embodiments of the present disclosure address this flaw and overcome problems with existing valve members.

Figure 4:
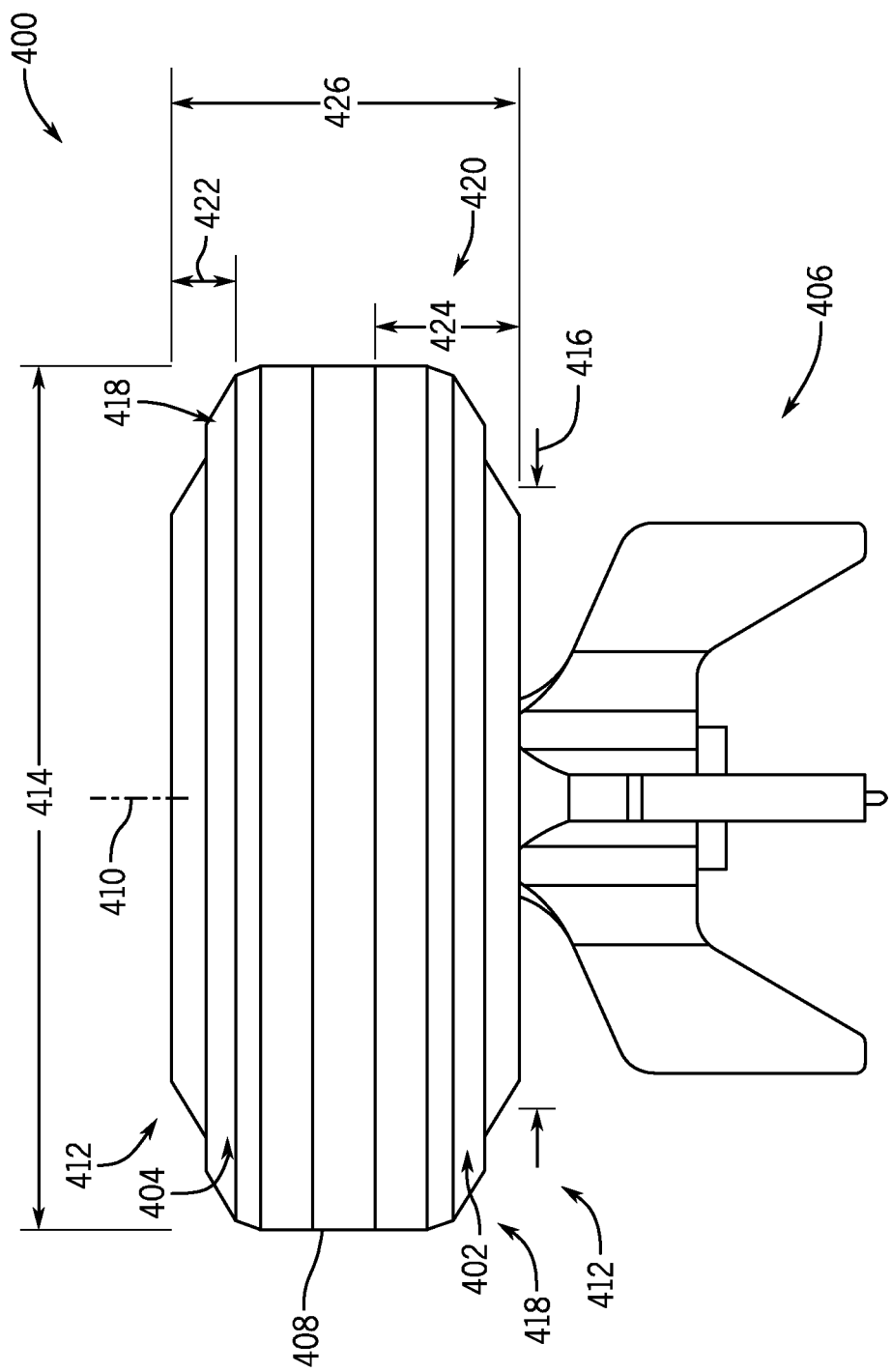
FIG. 4 is a side view of an embodiment of a valve member, in accordance with embodiments of the present disclosure.

FIG. 4 is view of an embodiment of a valve member 400 that may also be referred to as a dual use valve member. In certain configurations, the valve member 400 may also be referred to as a symmetrical valve member, a dual use symmetrical valve member, or the like. It should be appreciated that references to symmetry are for illustrative purposes, and various embodiments, as will be described herein, may include asymmetrical components of the valve member 400 and/or components of the valve member 400. In this embodiments, the valve member 400 includes a pair of sealing assemblies 402, 404 (e.g., sealing elements) that may be separately deployed and used during pumping operations. That is, a particularly selected orientation of the valve member 400 may enable use of a selected sealing assembly, while leaving the remaining sealing assembly for later use, for example, by changing the orientation of the valve member 400. Moreover, as will be described below, in various embodiments, the orientation of the valve member guide legs 406 (e.g., legs, guide legs, valve member legs) is also adjustable, via one or more coupling assemblies, thereby providing a valve member that can be used in two different orientations, which may increase a useful life of the valve member 400.

The illustrated valve member 400 includes the sealing assemblies 402, 404 arranged circumferentially about a body 408 such that the sealing assemblies 402, 404 extend around an axis 410. Each sealing assembly 402, 404 is positioned proximate a respective body strike face 412. In this embodiment, the sealing assemblies 402, 404 have respective sealing assembly diameters 414 that are larger than the body strike face diameters 416. It should be appreciated that portions of each of the diameters 414, 416 are shown as being variable due to slanted faces. In operation, both of a sealing element strike face 418 and the body strike face 412 may engage the strike face 210 of the valve seat 202.

The illustrated valve member 400 may be referred to as a symmetrical valve member with respect to an upper portion 420 (e.g. body element) that excludes the legs 406. However, as noted above, the upper portion 420 may also be asymmetrical. For example, notches or grooves may be formed within the body 408. In other words, the upper portion 420 or body element may describe the portion of the valve member 400 including the respective strike faces 412, 418 and/or the body 408 and the sealing elements 402, 404. Various dimensions of the upper portion 420, such as a strike face height 422, sealing assembly height 424, and the like may be substantially equal, thereby enabling the valve member 400 to be reused in a different orientation. Orientation may refer to which of the sealing assemblies 402, 404 engages the valve seat 202 in operation. For example, the illustrated embodiment is directed toward a first orientation where the sealing assembly 402 would engage the valve seat 202. However, in a second orientation, the sealing assembly 404 would engage the valve seat 202 and the legs 406 would be positioned proximate the sealing assembly 404.

The illustrated valve member 400 includes an upper portion height 426, which may be greater than a height of a traditional valve member to accommodate the additional sealing assembly 404. For example, the additional height may be due to the inclusion of another strike face and/or added material to accommodate reception of an additional sealing assembly.

In embodiments, the sealing assemblies 402, 404 are coupled to the body 408 via a manufacturing process, such as injection molding. As a result, the sealing assemblies 402, 404 may not be removable (e.g., removing the assemblies may destroy or otherwise reduce the effectiveness of the sealing assemblies). In other embodiments, the sealing assemblies 402, 404 may be mechanically coupled or otherwise coupled to the body 408, for example, via a friction fit where the assemblies 402, 404 are stretched over the body 408 and then allowed to retract to engage various mating portions of the body 408.

Figure 5:
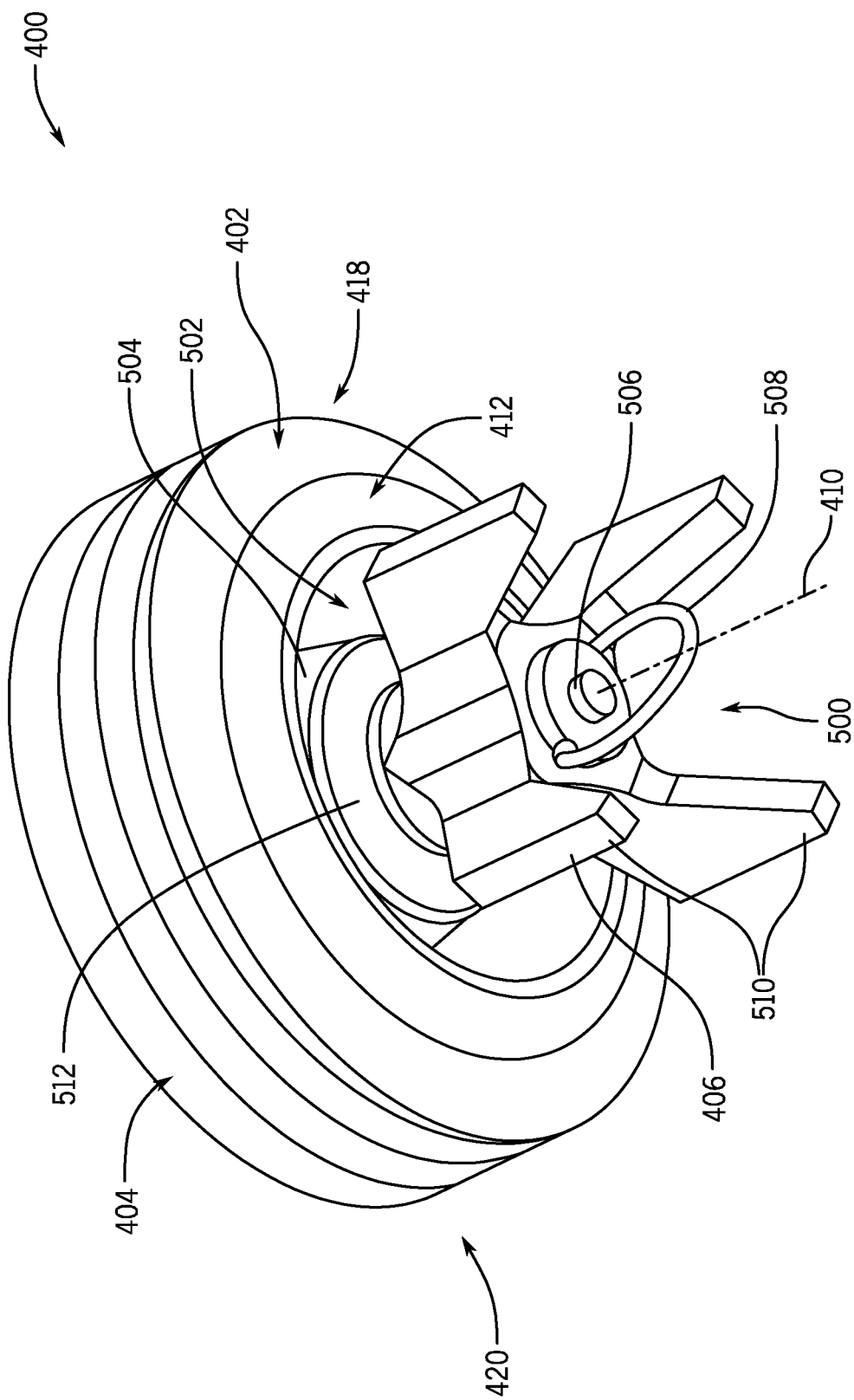
FIG. 5 is a bottom perspective view of an embodiment of a valve member, in accordance with embodiments of the present disclosure.

FIG. 5 is a bottom perspective view of the valve member 400. In this embodiment, the sealing assembly 402 and its respective sealing element strike face 418 is visible proximate the body strike face 412. The legs 406 are coupled proximate to the sealing assembly 402 and extend axially away from the strike faces 412, 418 along the axis 410. In this embodiment, the legs 406 are removably coupled to the upper portion 420 via a coupling assembly 500. For example, the illustrated upper portion 420 (which may be formed by the body 408) includes a recessed portion 502 with a mounting platform 504 that receives the legs 406. In this embodiment, the coupling assembly 500 includes a retractable pin 506, with a handle 508 to engage and release the pin 506, thereby securing the legs 406 to the mounting platform 504 and/or releasing the legs 406 from the mounting platform 504. For example, the pin may end through an aperture formed in the legs 406 and catch a portion within the mounting platform 504 to block removal of the pin without using the handle 508. As the strikes faces 412, 418 are worn down or damaged, the legs 406 may be removed and then moved to the opposite mounting platform (FIG. 6).

As described above, the guide legs 406 may extend into a bore of the valve seat 202 to guide axial movement of the valve member 400. In this embodiment, the guide legs 406 may refer to an assembly that includes prongs 510 coupled to a base 512. The illustrated embodiment includes 4 prongs 510, however, it should be appreciated that more or fewer prongs 510 may be included. Additionally, the base 512 may include a mounting surface or interface to engage one or more portions of the mounting platform 504 and/or recesses portion 502.

Figure 6:
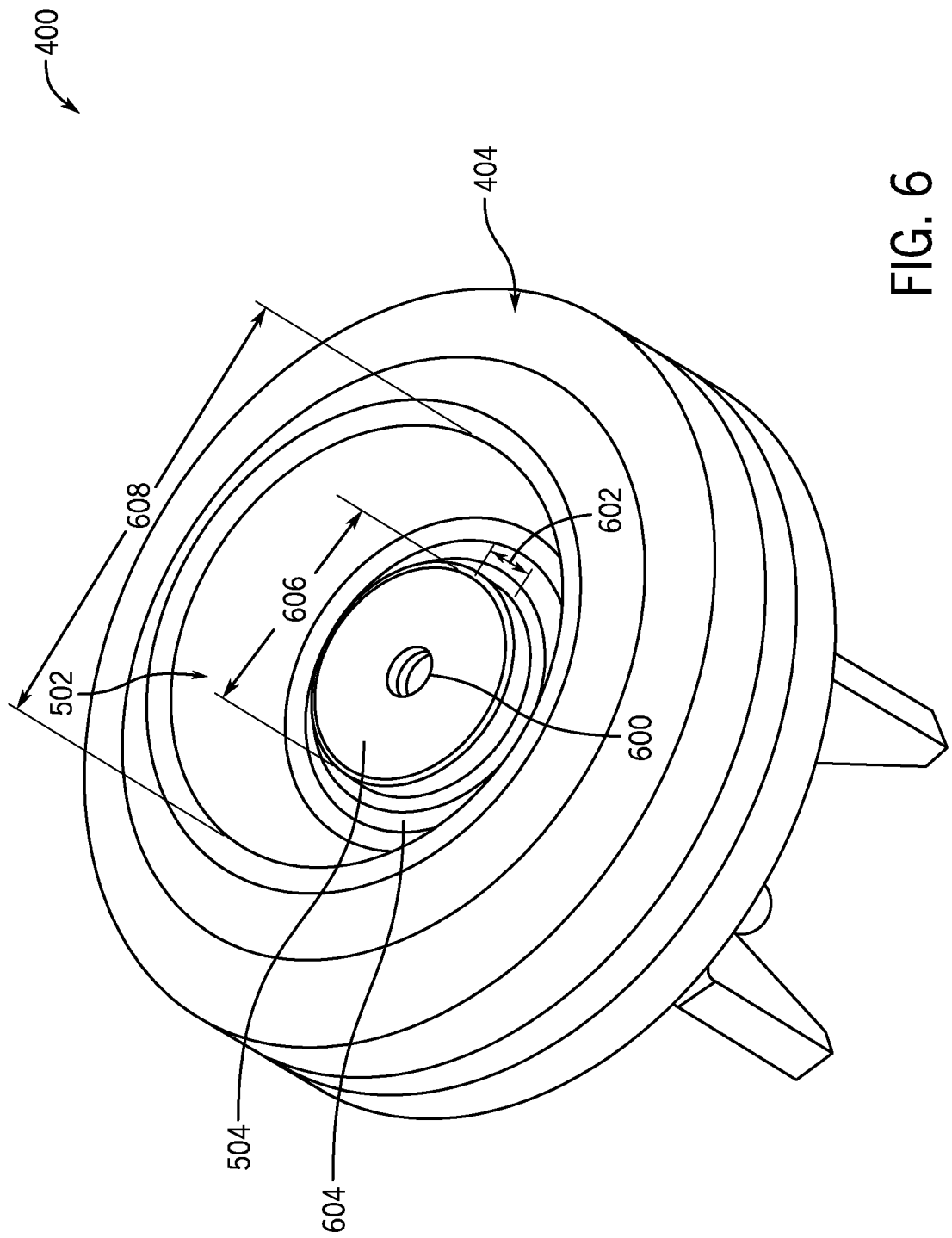
FIG. 6 is a top perspective view of an embodiment of a valve member, in accordance with embodiments of the present disclosure.

FIG. 6 is a top perspective view of the valve member 400 illustrating a symmetrical mounting platform 504 having an aperture 600, which may be used to receive one or more components of the coupling assembly 500. As noted above, reference to the symmetry of the mounting platform 504 is for illustrative purposes, and various embodiments may include one or more asymmetrical components. In an example, the mounting platforms 504 may have difference sizes for different ends of the valve member 400, which may provide a visual indication to the operation regarding the orientation of the valve member 400. In the illustrated embodiment, the mounting platform 504 is arranged within recessed portion 502 and extends a platform distance 602 from a recess base 604. It should be appreciated that the platform distance 602 may be particularly selected based on a leg length or other expected operational characteristics of the valve member 400. In this embodiment, a mounting platform diameter 606 is less than a recess diameter 608, but it should be appreciated that in other embodiments the base 604 may replace the mounting platform 504. That is, the mounting platform 504 may be omitted in various embodiments while still utilizing the coupling assembly 600.

Figure 7:
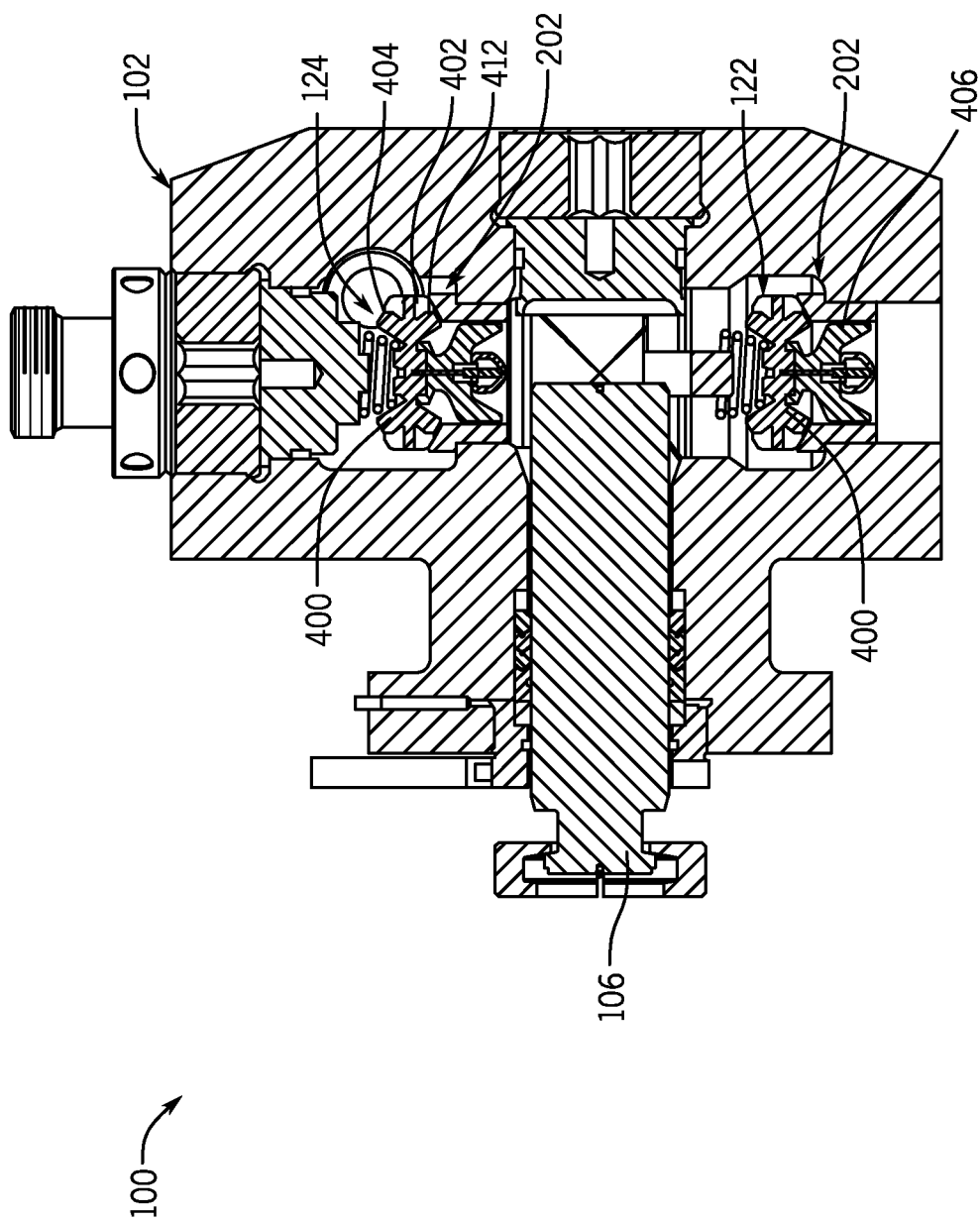
FIG. 7 is a schematic cross-sectional view of an embodiment of a pump assembly including an embodiment of a dual use valve member, in accordance with embodiments of the present disclosure.

FIG. 7 is a cross-sectional view of an embodiment of the pump assembly 100 illustrating the valve members 400 utilized with the inlet valve assembly 122 and the outlet valve assembly 124. In the illustrated embodiment, respective valve members 400 are arranged such that the sealing assembly 402 is positioned in a working orientation (e.g., the first orientation) proximate the legs 406. As a result, during operation of the pump assembly 100, the sealing assembly 402 and associated proximate strike face 412 will engage the valve seats 202. Over time, damage may accumulate such that the sealing performance of the valve assemblies 122, 124 reduces. Accordingly, in various embodiments, the valve assemblies 122, 124 may be removed for evaluation and repair. Utilizing embodiments of the present disclosure, rather than replacing the entire valve member 400, the valve member 400 may be rotated to the second orientation to position the sealing assembly 404 proximate the valve seat 202. Moreover, the legs 406 may be removed and coupled to the opposite mounting platform 504, via the coupling assembly 500, and thereafter put back into service. In this manner, the valve member 400 may be reused for additional operations, which decreases the operating cost of the fracturing job.

Figure 8:
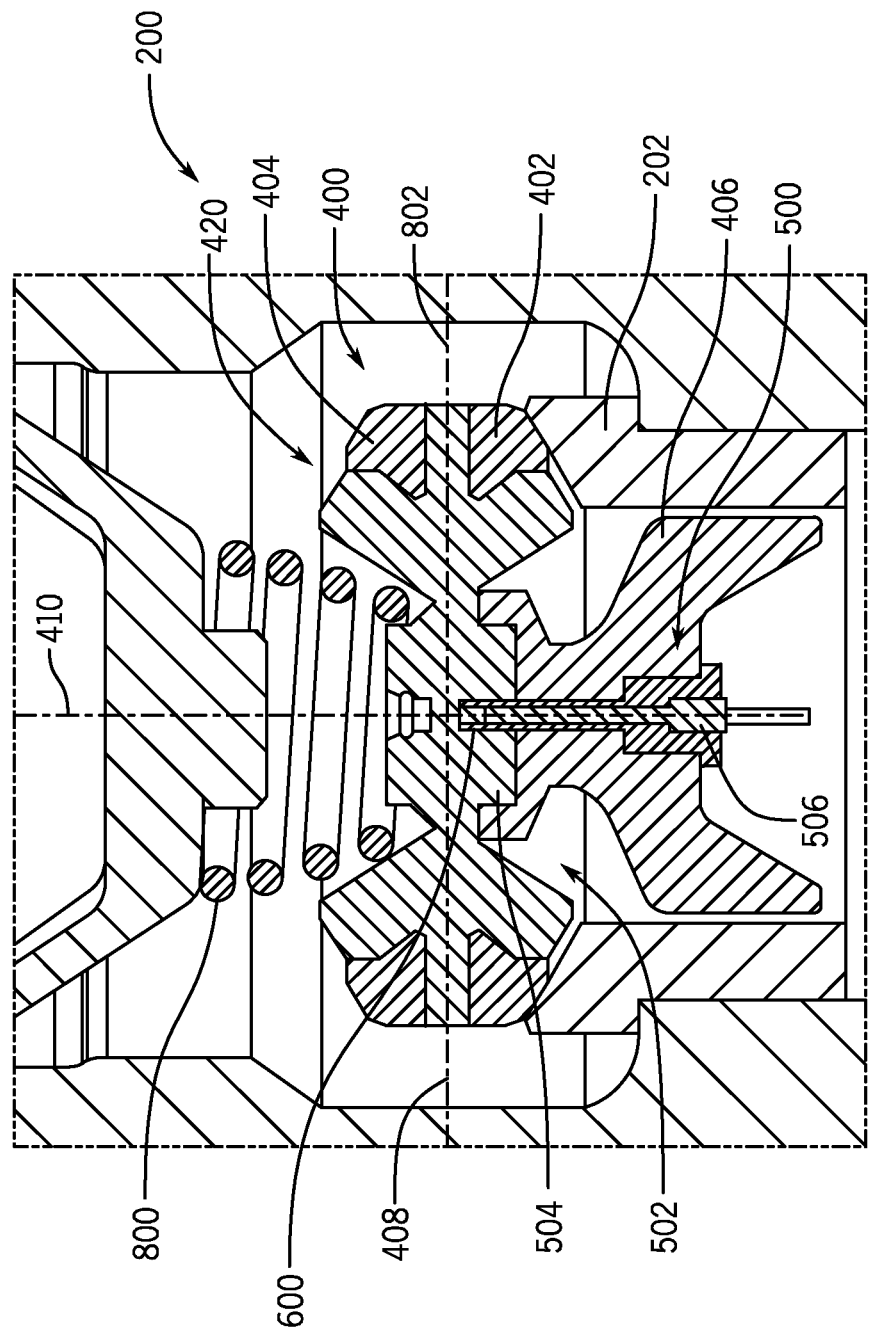
FIG. 8 is a schematic cross-sectional view of an embodiment of a valve assembly including an embodiment of a dual use valve member, in accordance with embodiments of the present disclosure.

FIG. 8 is a detailed cross-sectional view of the valve assembly 200 including the valve member 400. As shown, the valve member 400 is arranged in the first orientation, described above, such that the sealing assembly 402 is engaged with the valve seat 202 and the legs 406 are positioned proximate the sealing assembly 402. The illustrated legs 406 are coupled to the mounting platform 504 via the coupling assembly 500, which in this embodiment is the retractable pin 506. The retractable pin 506 engages the aperture 600 in the platform 504 to secure the legs 406 to the body 408.

As shown, a spring 800 may be utilized to bias the valve member 400 in a closed position (e.g., a position where the sealing assembly 402 contacts the valve seat 202). Embodiments of the present disclosure do not interrupt this operating mechanism because, as illustrated, the recessed portion 502 and platform 504 do not interfere with operation of the spring 800. Furthermore, the illustrated valve member 400 (e.g., the upper portion 420) being symmetrical about both the axis 410 and a horizontal plane 802 enables operation in either of the first orientation or the second orientation, thereby providing an increased useful life of the valve member 400. However, asymmetrical components may also provide this same benefit. By way of example, asymmetry may be present in the body 408, such as by including a notch or groove, which may still enable operation of the valve member 400.

Figure 9:
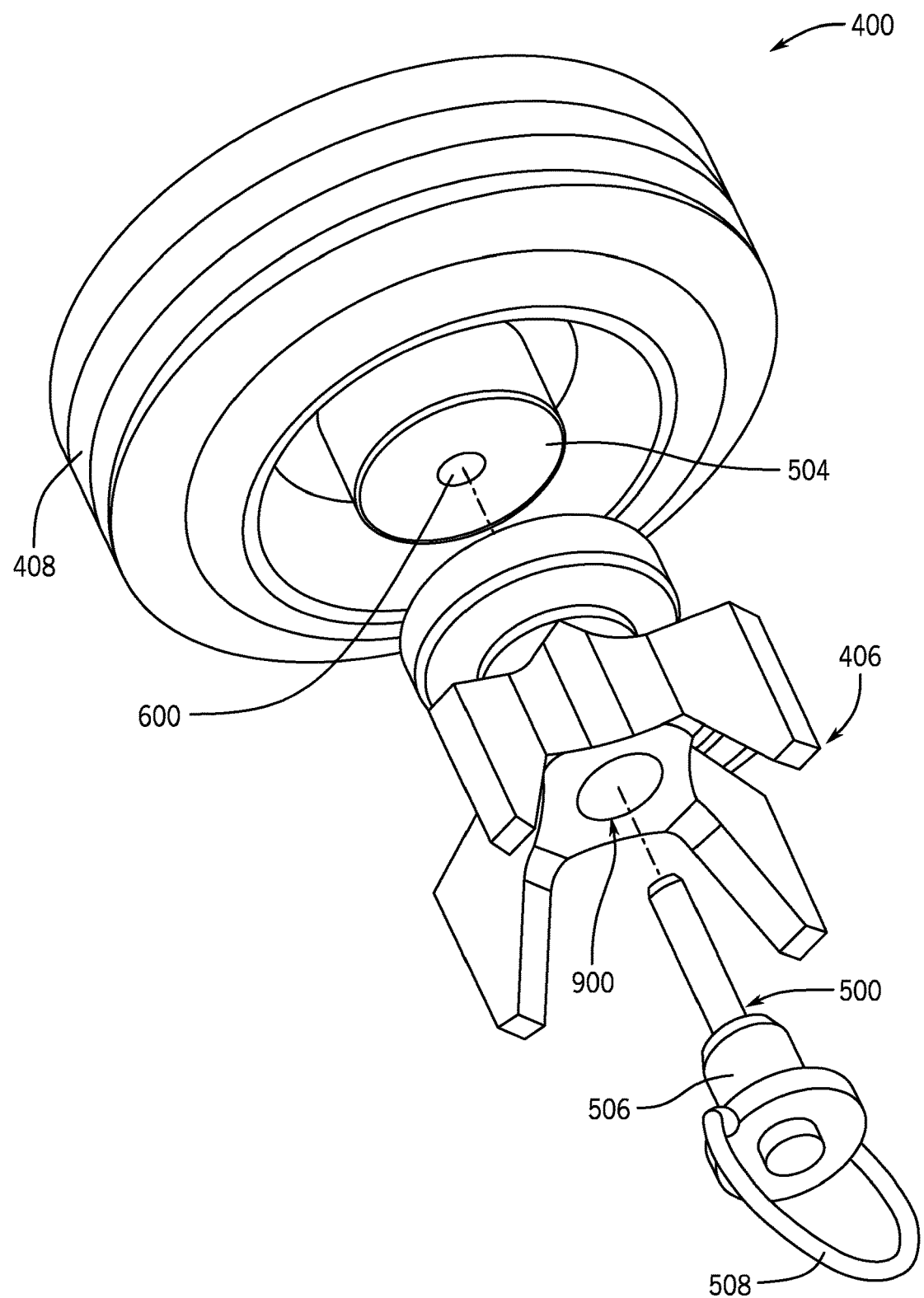
FIG. 9 is a bottom exploded view of an embodiment of a valve member, in accordance with embodiments of the present disclosure.

FIG. 9 is a bottom exploded view of an embodiment of the valve member 400 illustrating the legs 406 decoupled from the body 408. In this embodiment, the coupling assembly 500 is the retractable pin 506 that extends through an opening 900 in the legs 406 to engage the aperture 600 of the mounting platform 504. In operation, the opening 900 may be aligned with the aperture 600 and the pin 506 may be inserted through the opening 900 into the aperture 600. As a result, the legs 406 are secured to the body 408. To remove the legs 406, the pin 506 may be disengaged via the handle 508, which enables the legs 406 to be reused, for example, by mounting the legs 406 to the opposite mounting platform 504.

Figure 10B:
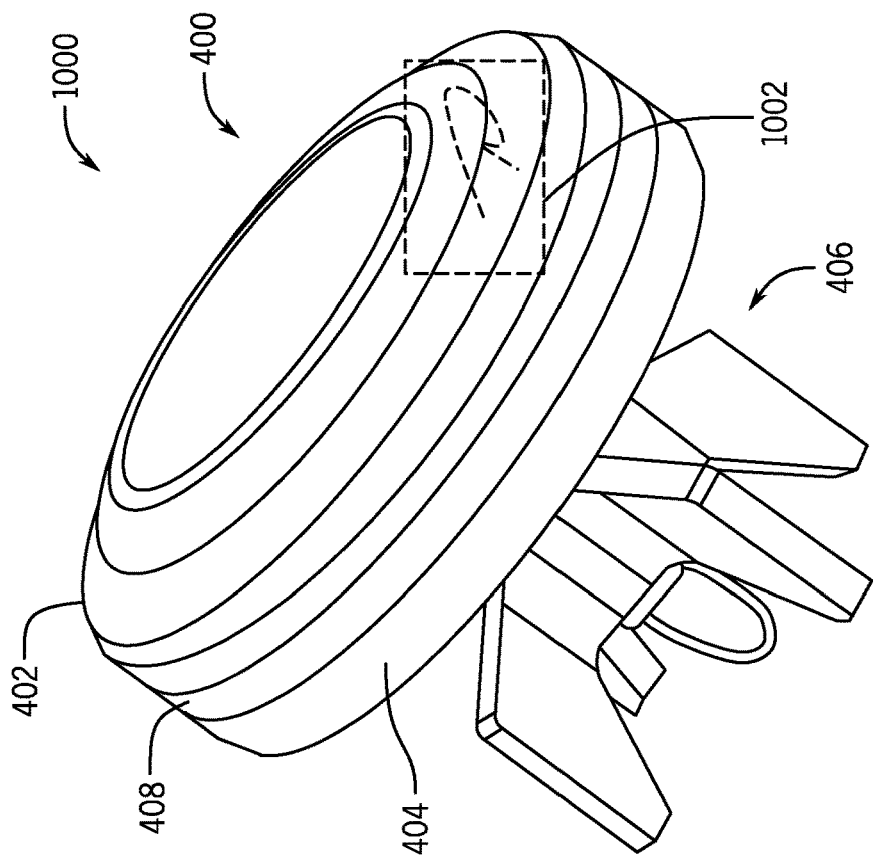
FIGS. 10A and 10B are perspective views of embodiments of a replacement operation for a valve member, in accordance with embodiments of the present disclosure.
Figure 10A:
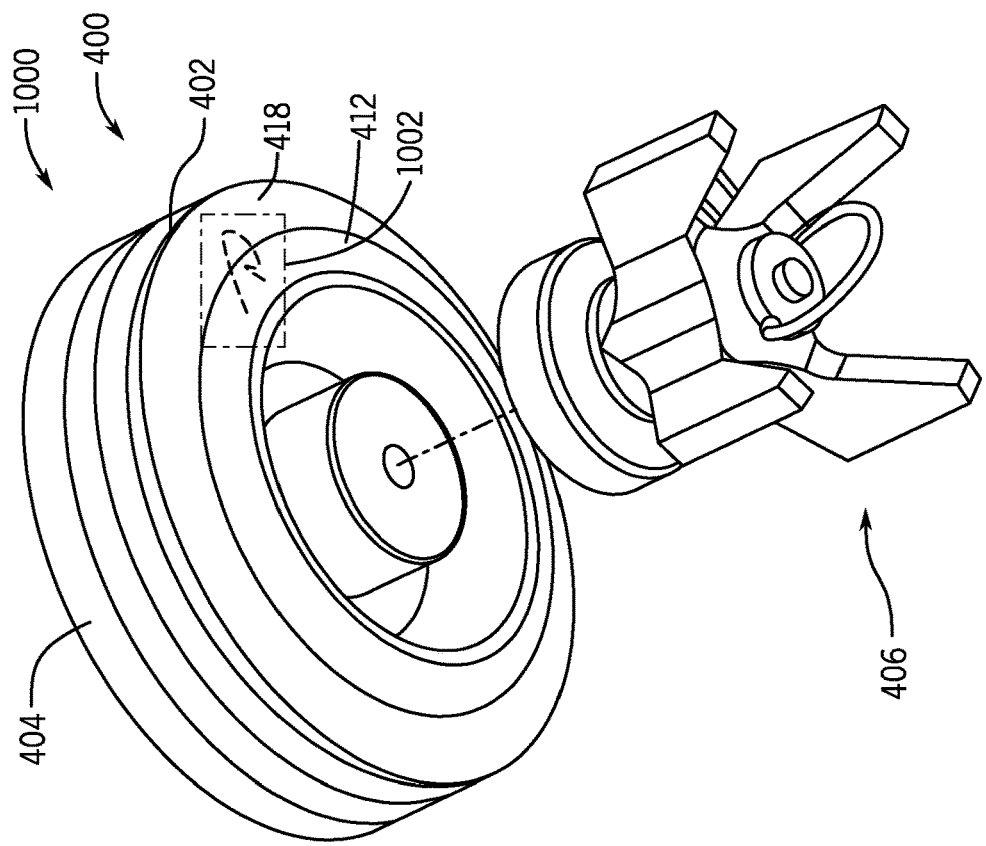

FIGS. 10A and 10B are perspective views illustrating a replacement operation 1000 for the valve member 400. In this replacement operation, an orientation of the valve member 400 is changed from the first orientation (e.g., sealing assembly 402 engages the valve seat) to a second orientation (e.g., sealing assembly 404 engages the valve seat). FIG. 10A illustrates the valve member 400 in the first orientation where the legs 406 have been removed. As shown, the strikes faces 412, 418 are damaged, for example, due to operation in the pump. This damaged is illustrated by defects 1002 shown in the faces 412, 418. In certain instances, valve members may operate for approximately 50 to 120 hours prior to damage accumulating to a point where an operator may determine to make a replacement. FIG. 10B illustrates the body 408 flipped over toward and positioned in the second orientation (e.g., sealing assembly 404 engages the valve seat) and the legs 406 are now attached to the opposite mounting platform 504. As a result, the valve member may be reinstalled into the pumping assembly 100 and reused because the defects 1002 are no longer interacting with the valve seat 202, as opposed to current technologies where the valve member is often scrapped or undergoes timely or expensive repairs.

Figure 11:
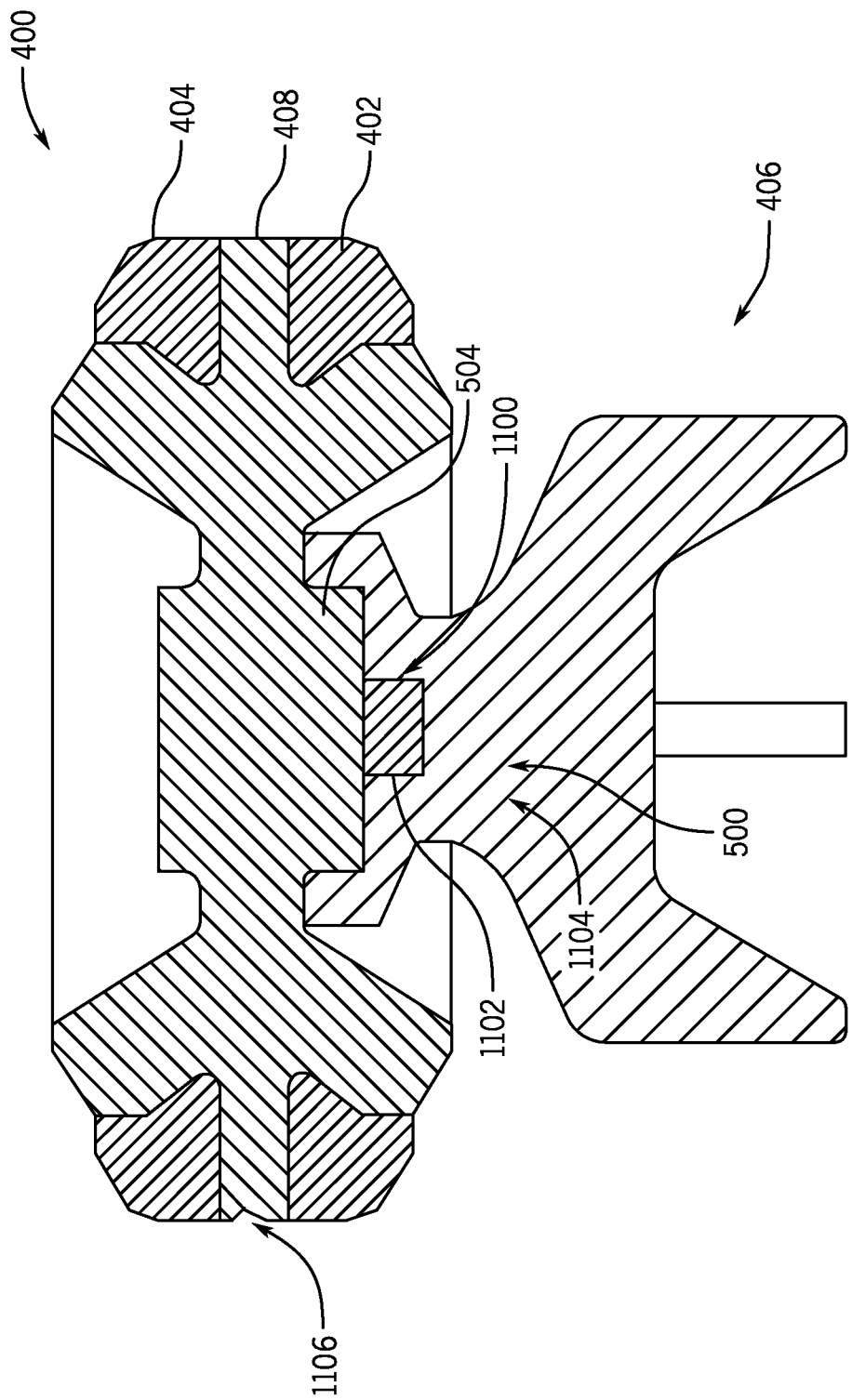
FIG. 11 is a cross-sectional view of an embodiment of a valve member with a coupling assembly, in accordance with embodiments of the present disclosure.

It should be appreciated that while various embodiments describe the coupling assembly 500 as being a retractable pin, various other methods may be utilized to couple the legs 406 to the body 408. By way of example, threaded couplings, magnetic couplings, bayonet fittings and the like may be utilized. FIG. 11 is a cross-sectional view illustrating a magnetic coupling 1100 being utilized as the coupling assembly 500. In the illustrated embodiment, a magnet 1102 is positioned within a cavity 1104 formed in the legs 406. While other embodiments may include the magnet 1102 positioned within the mounting platform 504, it should be appreciated that positioning the magnet 1102 within the legs 406 reduced the number of magnets used in the system, thereby providing a more economical configuration. In various embodiments, the magnet 1102 may be particularly selected to have sufficient magnetic attraction for use within a fracturing pump. The magnet 1102 may be any strong magnet, such as rare earth magnets (e.g., neodymium, samarium-cobalt, etc.). In operation, the legs 406 may be removed to adjust the orientation of the body 408 with sufficient force.

As noted above, various embodiments may include valve members 400 that are not symmetrical about either their horizontal plane or a vertical plane. In this example, a notch 1106 is illustrative in the body 408. Accordingly, symmetrical is no longer present with respect to either the vertical or the horizontal plane. However, as will be appreciated, the sealing effectiveness of the valve member 400 is not compromised due to the location of the sealing assemblies 402, 404. In this manner, various modifications and the like may be made to the body 408.

Figure 12:
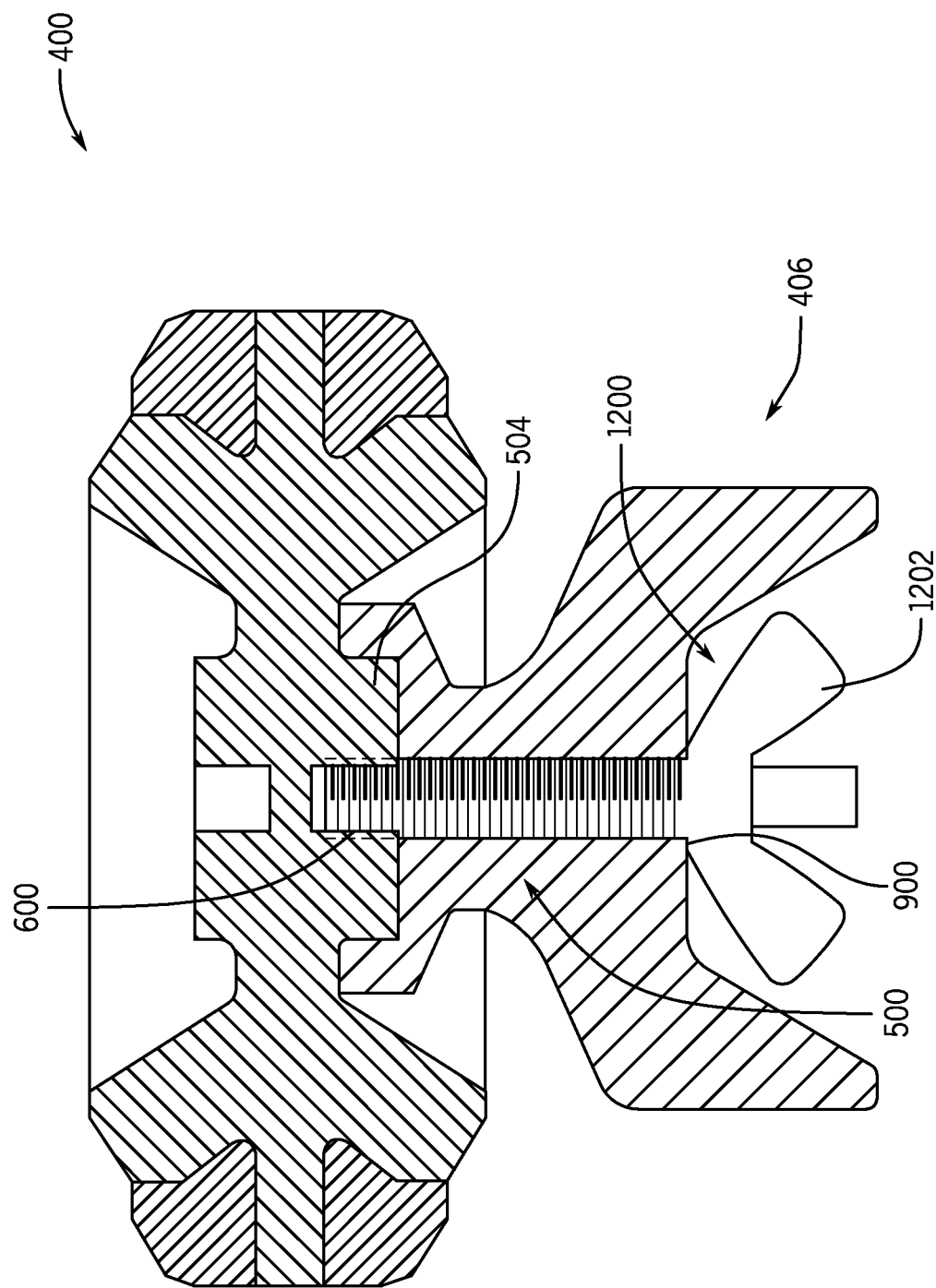
FIG. 12 is a cross-sectional view of an embodiment of a valve member with a coupling assembly, in accordance with embodiments of the present disclosure.

FIG. 12 is a cross-sectional side view of an embodiment of the valve member 400 where the coupling assembly 500 is a threaded coupling 1200. In the illustrated embodiment, a threaded fastener 1202 is utilized to engage the aperture 600, which may include mating threads. Moreover, in embodiments, the opening 900 may also include mating threads. The illustrated threaded fastener 1202 is a wing nut, but it should be appreciated that any reasonable threaded fastener may be utilized in various embodiments to facilitate coupling the legs 406 to the body 408.

Figure 13:
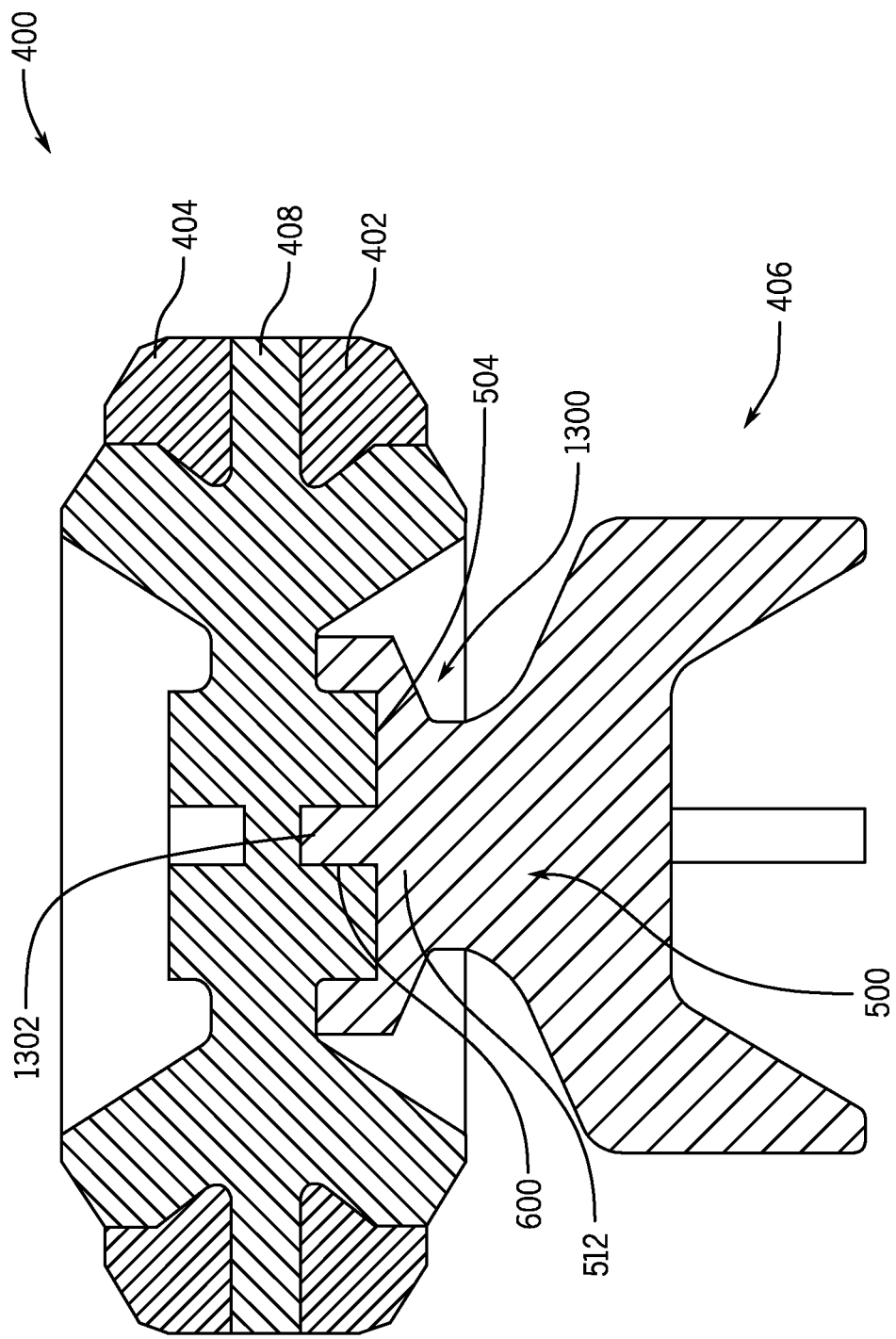
FIG. 13 is a cross-sectional view of an embodiment of a valve member with a coupling assembly, in accordance with embodiments of the present disclosure.

FIG. 13 is a cross-sectional side view of an embodiment of the valve member 400 where the coupling assembly is a threaded coupling 1300, where the legs 406 include a threaded coupling extension 1302 extending upwardly from the leg base 512. In this configuration, the threaded coupling extension 1302 engages mating threads of the aperture 600. Advantageously, separate couplings and fittings are removed from the embodiment illustrated in FIG. 13, which may be easier for operators to use at a crowded well site.

Figure 14:
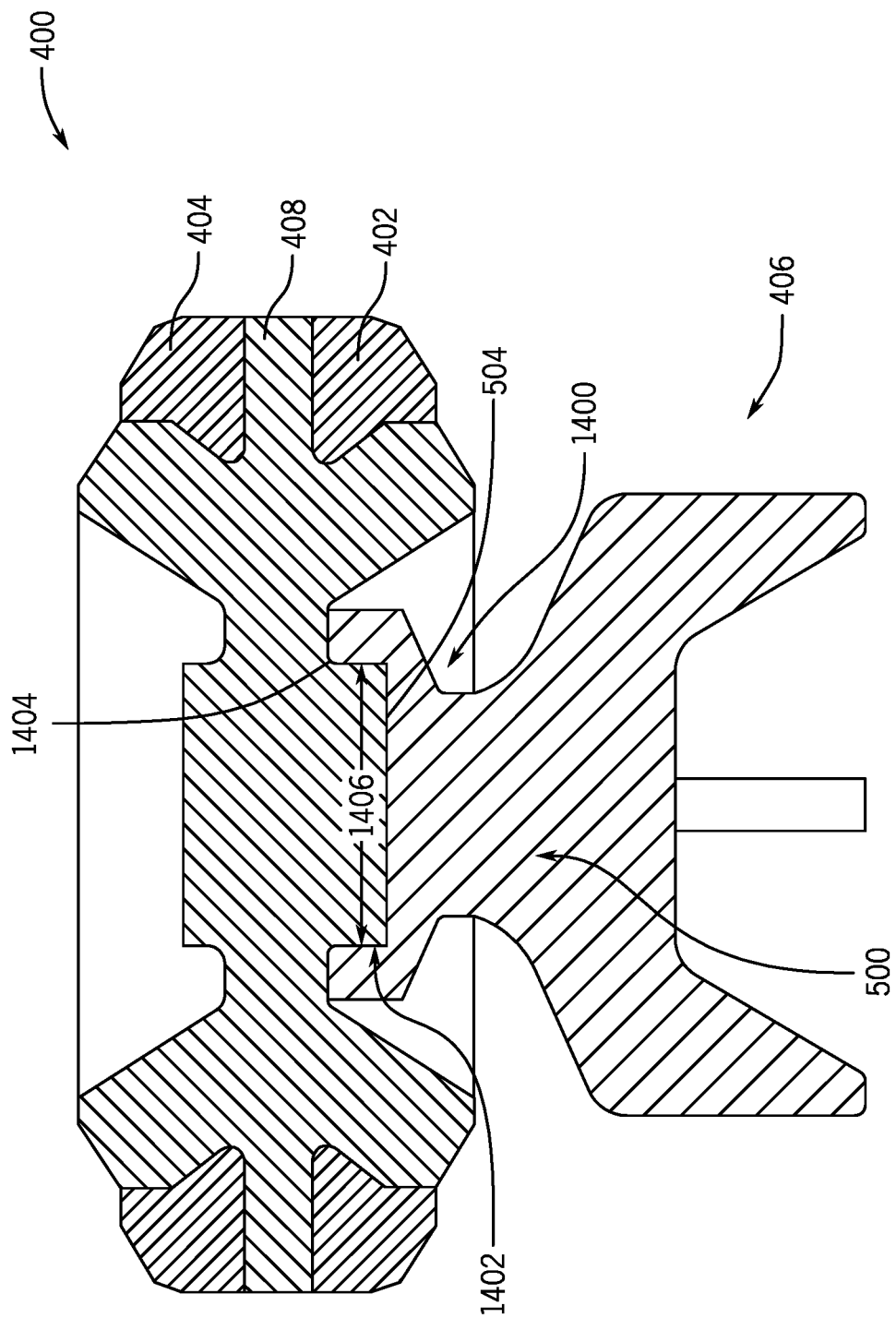
FIG. 14 is a cross-sectional view of an embodiment of a valve member with a coupling assembly, in accordance with embodiments of the present disclosure.

FIG. 14 is a cross-sectional side view of an embodiment of the valve member 400 where the coupling assembly is a threaded coupling 1400, where the legs 406 include a recessed portion 1402 that receives the mounting platform 504. Sidewalls 1404 of the recessed portion 1402 may include threads that engage mating threads on an outer diameter 1406 of the mounting platform 504. Like the embodiment of FIG. 13, additional fasteners or fittings are removed, thereby providing a simplified installation procedure.

Figure 15:
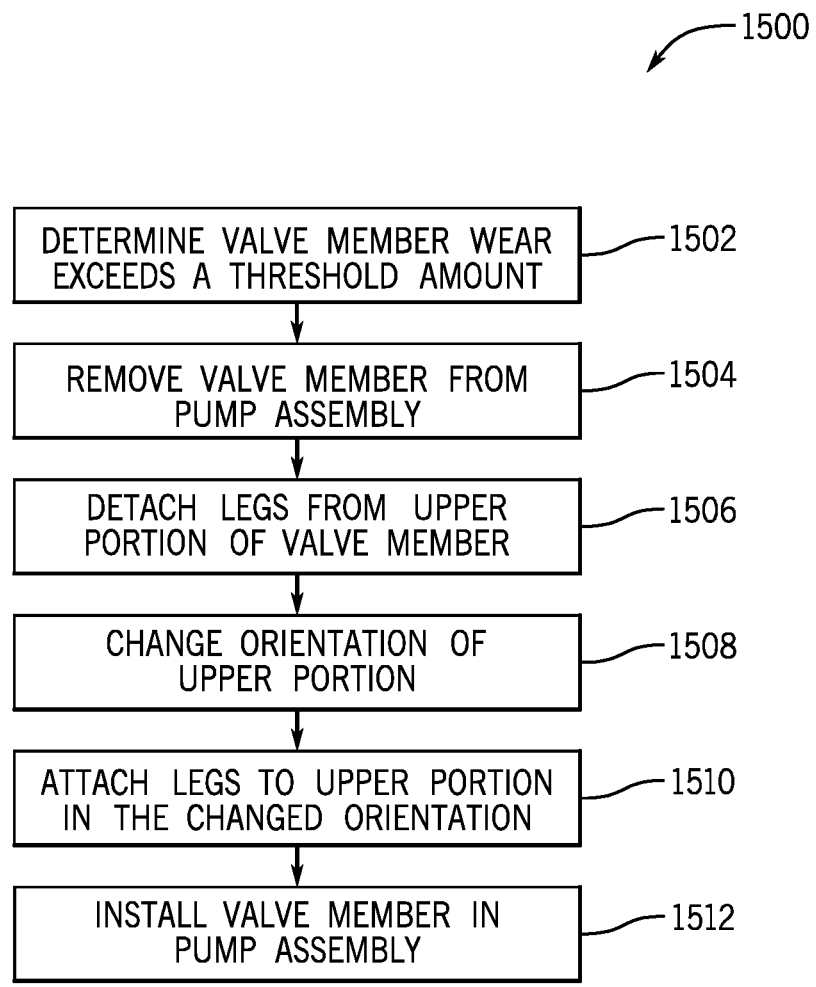
FIG. 15 is a flow chart of an embodiment of a method for installing a valve member, in accordance with embodiments of the present disclosure.

FIG. 15 is a flow chart for an embodiment of a method 1500 for utilizing a dual use valve member. It should be appreciated that in this method, and all methods described herein, there may be more or fewer steps. Additionally, the steps can be performed in any order, or in parallel, unless otherwise specifically stated. In this example, a valve member wear is determined to exceed a threshold amount 1502. This threshold may correspond to a time in operation, a pressure drop, a leak rate, or any other reasonable value. Furthermore, the threshold may correspond to a visual inspection that identifies one or more defects to determine whether replacement is justified. The valve member is removed from the pump assembly 1504 and the legs are detached from the valve body 1506. For example, a coupling mechanism may be used to remove the legs from the valve body. As noted above, traditional valve members are integrally formed with the legs, preventing removal of the legs. An orientation of the valve body is changed 1508. For example, a first orientation may correspond to a first sealing element engaging a valve body while a second orientation may correspond to a different, second sealing element engaging the valve body. In other words, a first orientation may be shifted to a second orientation by flipping the valve body 180 degrees about a horizontal plane. The legs are reattached to the valve body 1510. The legs may be reattached such that the legs are mounted proximate the sealing element that will engage the valve seat. That is, the legs are reattached to a different side of the valve body than when the valve body was removed from the pump assembly. The valve member may then be reinstalled for use in the pump assembly 1512. In this manner, the valve member may be reused rather than traditional methods that discard damaged valve members.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve assembly for a fracturing pump, comprising:
a valve seat having a bore, the valve seat having a strike face; and
a valve member positioned to reciprocate within the bore, the valve member moving between open and closed positions, the valve member comprising:
a body without a through hole;
a first sealing assembly positioned proximate a first body strike face at a first side of the body;
a second sealing assembly positioned proximate a second body strike face at a second side of the body, the second side being opposite the first side; and
legs removably coupled to the body, the legs being coupled to the first side of the body via a coupling assembly at an interface between the coupling assembly and an end of the body at a central portion of the body, the coupling assembly restricted to a first side of the body opposite a second side, and the interface being a first distance from an end of the second body strike face that is smaller than a second distance between the end of the second body strike face and the first body strike face.

2. The valve assembly of claim 1, wherein the valve member further comprises:
a recessed portion formed in the body, the body being an integrally formed component; and
a mounting platform positioned within the recess and forming at least a portion of the central portion of the body, the mounting platform positioned to couple to the legs.

3. The valve assembly of claim 1, wherein the coupling assembly is a threaded coupling that directly engages the body and is axially limited with respect to a horizontal plane extending through the body.

4. The valve assembly of claim 1, wherein the coupling assembly comprises at least one of a pin coupling or a magnetic coupling.

5. The valve assembly of claim 1, wherein an upper portion of the valve member, comprising the body, the first sealing assembly, and the second sealing assembly, is symmetrical about at least one of a vertical axis or a horizontal plane.

6. The valve assembly of claim 1, where in the legs comprise:
a leg base, the leg base contacting the body when the legs are joined to the body; and
prongs extending from the leg base.

7. A valve member for a valve assembly, comprising:
a body without a through hole;
a first sealing assembly, coupled to a first side of the body, the first sealing assembly forming at least a portion of a first strike face;
a second sealing assembly, coupled to a second side of the body, opposite the first side, the second sealing assembly forming at least a portion of a second strike face;
a guide leg assembly coupled to the first side of the body; and
a mounting platform positioned on the first side of the body, the mounting platform extending axially away from a body base, the mounting platform extending a platform distance such that an end of the mounting platform is axially closer to the body base than a bottom of the first strike face, and the guide leg assembly having an opening that receives at least the end of the mounting platform and the guide leg assembly contacting the base when the end of the mounting platform is within the opening.

8. The valve member of claim 7, wherein the valve member is operable in a first orientation and a second orientation, the first orientation corresponding to a first configuration where the first sealing assembly is positioned to engage a valve seat of the valve assembly, and the second orientation corresponding to a second configuration where the second sealing assembly is positioned to engage the valve seat of the valve assembly, the guide leg assembly being removably coupled to the first side when the valve member is in the first orientation and removably coupled to the second side when the valve member is in the second orientation.

9. The valve member of claim 7, further comprising:
a coupling assembly for joining the guide leg assembly to the body, the coupling assembly being a spring-loaded retractable pin.

10. The valve member of claim 7, further comprising:
a coupling assembly for joining the guide leg assembly to the body, the coupling assembly removably attaching the guide leg assembly to the body.

11. The valve member of claim 10, wherein the coupling assembly comprises at least one of a magnetic coupling or a wing-screw threaded to both the guide leg assembly and the body.

12. The valve member of claim 7, wherein the body is symmetrical about both a vertical axis and a horizontal plane.

13. The valve member of claim 7, further comprising:
a recessed portion formed in the body, wherein the mounting platform is positioned within the recessed portion, the recessed portion having a recess depth that is greater than a platform distance such that the entire mounting platform is within the recess.

14. The valve member of claim 7, further comprising:
a coupling assembly for joining the guide leg assembly to the body, the coupling assembly being a bayonet fitting.

15. The valve member of claim 7, where the first sealing assembly and the second sealing assembly are coupled to the body via at least one of a manufacturing process or a mechanical coupling.

16. The valve member of claim 7, wherein each of the first strike face and the second end strike face is adapted to be used during a pumping operation, the first strike face being used at a different time than the second end strike face.

17. A method for adjusting a valve member, comprising:
removing a valve member from a pumping assembly, the valve member being in a first orientation that positions a first sealing assembly in a downward facing position and comprising a valve member body without a through hole;
detaching legs from a first side of the valve member body;
changing an orientation of the valve member body to a second orientation, different from the first orientation, the second orientation positioning a second sealing assembly, separate from the first sealing assembly, in the downward facing position;
attaching legs to a second side of the valve member body, the legs engaging a coupling interface recessed from a second strike face on the second side of the valve member body, the coupling interface being a first distance from the first strike face that is smaller than a second distance between the first strike face and a bottom of the second strike face; and
installing the valve member into the pumping assembly in the second orientation.

18. The method of claim 17, comprising:
determining valve member wear exceeds a threshold amount.

19. The method of claim 17, wherein changing the orientation of the valve member body comprises:
rotating the valve member body 180 degrees about a horizontal plane of the valve member body.

20. The method of claim 17, wherein changing the orientation of the valve member body comprises:
changing the orientation of at least one of the first sealing assembly or the second sealing assembly into an upward facing position.

* * * * *